S. Boyd.

Making Hoes.

N° 16,371. Patented Jan. 13, 1857.

UNITED STATES PATENT OFFICE.

SAMUEL BOYD, OF NEW YORK, N. Y.

MANUFACTURE OF HOES.

Specification of Letters Patent No. 16,371, dated January 13, 1857.

*To all whom it may concern:*

Be it known that I, SAMUEL BOYD, of the city, county, and State of New York, have invented a new and useful Article of Manufacture; and I do hereby declare that the following is a true and exact description of the same.

To enable others skilled in the art to make and use my invention, I will proceed to describe it, together with the process therewith pertaining, reference being had to the annexed drawings, making part of this specification, in which—

Figure 12:
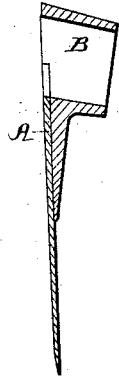

Figures 1, 2, 3, 4, 5, 6, and 7, are diagrams illustrative of the common method of manufacturing hoes, and Figs. 8, 9, 10, 11, and 12, are illustrative of my improved shoe, and the process by which it is manufactured; Fig. 12 being a sectional view.
Similar letters refer to the same parts.

Figure 1:
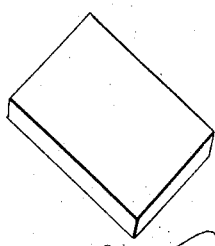
Figure 5:
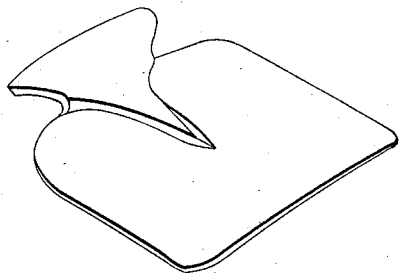
Figure 2:
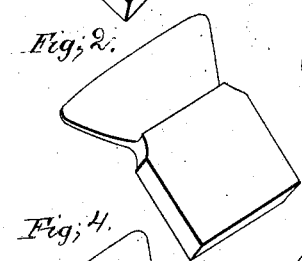
Figure 3:
Figure 7:
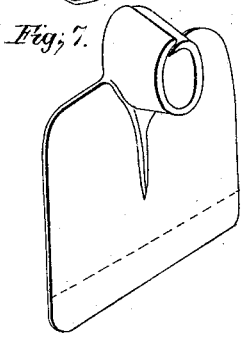
Figure 4:
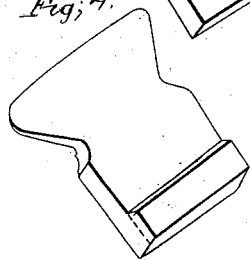
Figure 6:
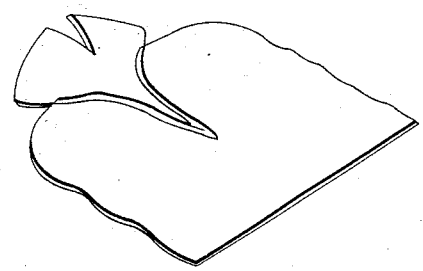

My invention consists of a new article of manufacture, viz., a hoe, having a sheet steel blade, and a malleable cast iron eye, welded together.
Hoes are generally made either wholly of steel or of wrought iron with steel cutting edges welded thereupon. The latter is the most common method. For this purpose, common bar iron is employed, which is first cut off into junks, as shown in Fig. 1. The next process is to heat the iron, and plate it out under the hammer, preparatory to the formation of the eye, as in Fig. 2. The operation of welding on the steel upon the face or buck is then performed; the iron being again heated, together with the steel slip, (Fig. 3), and by means of the hammer welded together, as shown in Fig. 4. The iron and steel thus combined are now again heated, and hammered out to the proper degree of thickness and form, (as shown in Fig. 5,) an operation termed plating. The process of forming the eye is now begun, and for this purpose the plate is again heated and the upper or eye part is split and twisted, as is shown in Fig. 6. The plate is then again heated and the lip parts of the eye bent over and lapped together, ready for welding, as is shown in Fig. 7. The plate is now headed for the last time, and the lips of the eye are welded, the plate hammered straight, as in Fig. 7. The process of turning the eye and welding it together is a very difficult one, requiring great care and experience on the part of the workman. It is almost out of the question to make the hoes alike in the form of the eye or in weight. The process is moreover slow, tedious and expensive; six distinct heats, it should be noted, are required. After the welding is completed, the hoe is ready to be trimmed and ground for finishing. The trimming is done by a press. A large amount of metal is wasted in the trimming, owing to the impossibility of hammering the plates out to an exact size. Great labor is also required in the grinding, owing to the uneven surface of the plate, occasioned by hammering. The plate when finished is also more or less uneven, for it is impossible to produce an even thickness by the hammer. This process also requires that the metal shall be thicker than in the process I am about to describe; because if the iron plate is too thin, it can not be properly worked under the hammer.

Figure 8:
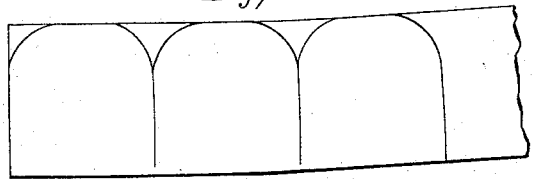
Figure 9:
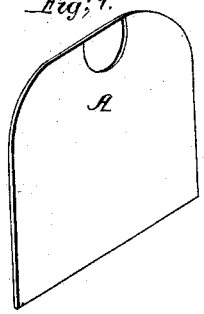
Figure 10:
Figure 11:
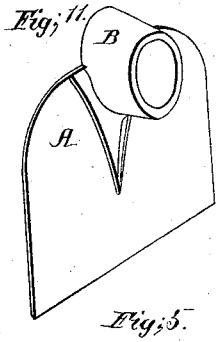

My improved hoe is composed of a sheet steel blade, and a malleable cast iron eye, united by welding; the process being as follows: The steel is first rolled in the ordinary manner into large sheets of the exact width of the hoe-blade; the upper portion being a little thicker than the bottom edge. The sheet is slightly curved, and conforms to the required curve of the hoe-blade. Fig. 8 shows a portion of a steel sheet, prior to cutting out the blades. The sheet is now fed under a punching press, which is provided with a suitable die, and the blades, A, are punched out, of proper shape, all ready for welding, with the greatest rapidity. Indeed, almost the only limit of the speed is the feeding along of the sheet. The blades thus formed will all be of exactly the same shape, weight and thickness, while the waste of metal is very trifling, as will be seen by reference to Fig. 8. Up to this period, it should be observed, the blades have not been heated. The eyes, B, are cast in molds, with great rapidity, and then annealed in the usual manner, so as to render them partially malleable, when they are ready for use. The blade, A, and eye, B, are now placed together, and held between a pair of tongs, and heated for welding; borax being employed as a flux in the usual manner. When the proper degree of heat is reached, the plate and eye are placed in a drop press, and a weight descends, which, in an instant, at one blow, effects the weld. The hoe is then withdrawn placed on an anvil, and the flat portion of the blade within the eye (indicated by red lines in Fig. 9) is clipped out. One heat is thus only required. This completes the process, and the hoe is ready for finishing by the grind-stone.

The increased rapidity of my process over the old method is obvious. I find, by actual experiments, that twenty complete hoes, ready for grinding, can be made by my plan during the time taken to forge a single hoe in the common manner; the facilities in both cases being equal.

I would here observe that I make no claim or pretensions to any new process in working or uniting metals. In short, I distinctly disclaim everything, except the herein-described new article of manufacture, which consists of a hoe, having a blade of sheet steel, and an eye of malleable cast iron, welded together.

The article thus produced is superior in quality and utility to hoes of the ordinary kind, and is more easily manufactured and far cheaper in cost. It is true that more steel is used in my blade than in the common hoe, the manufacture of which is herein described. But the greater ease, rapidity, and cheapness of my method, the doing away with all the heatings but one, the great reduction in the labor of grinding, owing to the smoothness of the steel plates, &c., far more than counterbalance the slight original difference in the expense of the metals.

My hoe possesses the virtue of being fully equal to hoes made of solid cast steel. It is equally as strong for all practical purposes, and equally as durable. By striking or ringing one of my hoes, it will be found that the union between the metals is complete. The weld is so perfect that the eye gives additional strength to that portion of the blade where the two unite; so that the blade breaks laterally below the eye when force is applied, but the eye and blade-portion in that vicinity remain whole. My hoes also possess the virtue of uniformity. The blades being rolled and punched, and the eyes being cast; the union being moreover effected by one blow, under a drop press; the conditions and manipulations in the manufacture of a given quantity, are always exactly the same. One hoe will not be inferior to the other. They will all be alike in excellence, in weight, and in formation. It is not possible for this to be the case with other hoes, not even those made of one entire piece of steel; the hand-forging which is indispensable utterly precludes uniformity. My hoes also possess the virtue of greater strength, for the same weight of metal, than any other hoe. This is evident, first, from the fact that the distribution of the metal, and the arrangement of its particles, in all parts, is perfectly uniform; whereas, in forged hoes, some parts and spots are necessarily thinner and more worked than others. Second, from the fact that it would be impossible to forge a hoe beyond a given degree of thinness and have it retain strength; whereas, the metal composing my hoe, since it is rolled, may be drawn out much thinner than in the common hoe, and still retain the proper strength; the eye, being of cast metal, may also be more accurately formed, and the weight of metal requisite for a given strength regulated with precision. My hoe also possesses the virtue of enabling the laborer to do more labor than he can accomplish with other hoes, having the same-sized blades. This arises from the fact that my hoe is lighter than others of the same-sized blade, yet it possesses equal if not greater strength. The common planter's hoe, with a blade of 7 inches width on its cutting edge weighs $2\frac{1}{4}$ pounds; whereas my hoe, of same size, weighs $1\frac{3}{4}$ pounds, a difference in favor of improvement of $\frac{1}{2}$ a pound or more than one third. The common planter's hoe, from its greater weight, also requires the use of a heavier and stronger handle than my hoe. It is plain that the laborer will much sooner become worn out and weary from wielding the common hoe than under the use of my improvement.

In 1833, a patent was granted to Strong and Sterry, for riveting a wrought eye to the blade; the joint being aided by brazing. This mode of union is clumsy and weak, and the blade and eye, by constant use, separate. Hoes of this description were at one time in vogue; but they have long since passed out of the market, being found worthless. They could be made cheaper than the forged hoes; and that was about their only recommendation. My hoe is not only cheaper than the riveted and brazed-eye hoe, but it is also far superior in durability and strength. In 1854, a patent was granted to Moses Gates, for uniting the blades and eyes of hoes. This consists of a method of riveting the eye or socket which is of wrought iron, to the blade, aided by soldering or brazing. This plan, like the above, shows an evident sacrifice of strength and durability; the only gain over the common hoe being in its lighter weight. In neither of the above plans is the forging of the eye rendered any easier than in the common hoe.

In my hoe, all rivets, slits, and manipulations such as are necessary in the manufacture of both the foregoing inventions, and which tend to impair the strength and utility of the article, are wholly discarded. I unite the blade and eye by a solid weld, so that they become, as it were, one piece of metal, and exhibit greater strength than the common forged blade and eye; the weight of metal being equal. I would here remark that I distinctly disclaim the making of hoes with sheet steel blades as such articles have long been known. I also disclaim the use of rolled steel for hoe blades as the same has been before used for this purpose. But a hoe with a sheet steel blade and a malleable cast iron eye united by welding has never, to the best of my knowledge and belief, been known, and constitutes a new and important article of manufacture.

In a previous part of this specification I have said that my hoe possessed the virtue of being fully equal to a hoe made of one entire piece of steel. I now go further than this and claim that my hoe possesses the virtue of being superior in strength to a hoe made of steel wholly, or any other metals, or put together in any other way, the weight of metal being the same. The true test of the strength of a hoe is its resistance when the back part of the eye is struck upon a solid substance. The common method of cleaning a hoe when its blade becomes clogged up by the adherence of moist earth, (as constantly happens in use) is to turn over the blade and strike the back part of the eye against a stone. The hoe that cannot stand this usage is considered and is, in fact, unfit for use. Thousands and thousands of hoes are annually broken when submitted to this treatment, and planters are often deceived in their purchases, by getting bad implements upon their hands—implements that are only defective in the eye part. From the above description of the test to which hoes are submitted it is plain that cast steel is an unfit metal for the manufacture of the eye part, for a slight blow, especially in cold weather is sufficient to break it. From the foregoing it must also be obvious that wrought iron is not the best metal for the purpose of a hoe as the eye part, when struck, as described, readily yields and the implement soon becomes useless. Malleable cast iron, having almost the strength of steel, without its brittleness, and the strength of wrought iron without its pliability is beyond all question the best metal for the eye part of a hoe as it will stand a much greater blow than either steel or wrought iron. The blade part of sheet steel is undoubtedly the very best and strongest metal for that purpose that could be employed. The union of the two metals by welding is certainly the strongest method of uniting such substances known in the arts.

The metals I employ are the best of any known, for the uses to which they are respectively applied. And they are put together in the most approved method for procuring strength. The hoe thus formed possesses new and peculiar virtues, heretofore unknown in articles of similar description, and constitutes an entirely new article of manufacture.

Having thus described my invention, I claim and desire to secure by Letters Patent, as a new article of manufacture—

A hoe, having a sheet steel blade and a malleable cast iron eye, welded together.

SAML. BOYD.

Witnesses:
ROBT. W. FENWICK,
W. TUSCH.